(12) United States Patent
Braun

(10) Patent No.: US 12,486,085 B2
(45) Date of Patent: Dec. 2, 2025

(54) CAP FOR CLOSING A CONTAINER FOR ADMINISTERING A MEDICATION, AND METHOD FOR PRODUCING SAME

(71) Applicant: BRAUNFORM GMBH, Bahlingen (DE)

(72) Inventor: Pamela Braun, Bahlingen (DE)

(73) Assignee: Braunform GmbH, Bahlingen (DE)

( * ) Notice: Subject to any disclaimer, the term of this patent is extended or adjusted under 35 U.S.C. 154(b) by 130 days.

(21) Appl. No.: 18/277,816

(22) PCT Filed: Feb. 15, 2022

(86) PCT No.: PCT/EP2022/053704
§ 371 (c)(1),
(2) Date: Aug. 18, 2023

(87) PCT Pub. No.: WO2022/175282
PCT Pub. Date: Aug. 25, 2022

(65) Prior Publication Data
US 2024/0124201 A1    Apr. 18, 2024

(30) Foreign Application Priority Data

Feb. 19, 2021  (DE) .................... 10 2021 104 026.4
May 21, 2021  (WO) ................. PCT/EP2021/063705

(51) Int. Cl.
*B65D 51/00*        (2006.01)
*A61J 1/14*         (2023.01)
(Continued)

(52) U.S. Cl.
CPC .......... *B65D 51/002* (2013.01); *A61J 1/1406* (2013.01); *B29C 65/16* (2013.01); *B29L 2031/56* (2013.01)

(58) Field of Classification Search
CPC .... B65D 51/002; B65D 51/00; B65D 51/005; A61J 1/1406; A61J 1/14; A61J 1/1412; A61J 1/1431
(Continued)

(56) References Cited

U.S. PATENT DOCUMENTS 2,236,491 A * 3/1941 Campbell ............ B65D 51/002
                                                    215/249
2,705,085 A * 3/1955 Glensky ............... B65D 51/002
                                                    D9/438
(Continued)

FOREIGN PATENT DOCUMENTS

DE    19818314 A1    9/1999
DE  102008009418 B3    4/2009
(Continued)

OTHER PUBLICATIONS

International Search Report and Written Opinion mailed May 16, 2022 in related/corresponding International Application No. PCT/EP2022/053704.
(Continued)

*Primary Examiner* — Anthony D Stashick
*Assistant Examiner* — Prince Pal
(74) *Attorney, Agent, or Firm* — PATENT PORTFOLIO BUILDERS PLLC

(57) ABSTRACT

A cap for closing a container for administering a medication includes a pot-shaped body having a cavity with at least one or more openings and a base plane for delimiting the cavity at least in some regions. The cap also has at least one septum. The body has a dome with an end-face opening closed by the septum. The dome protrudes from the base plane on the base plane face opposite the cavity. The septum is inserted into a receiving area of the dome under pretension.

22 Claims, 2 Drawing Sheets

Figure 1:
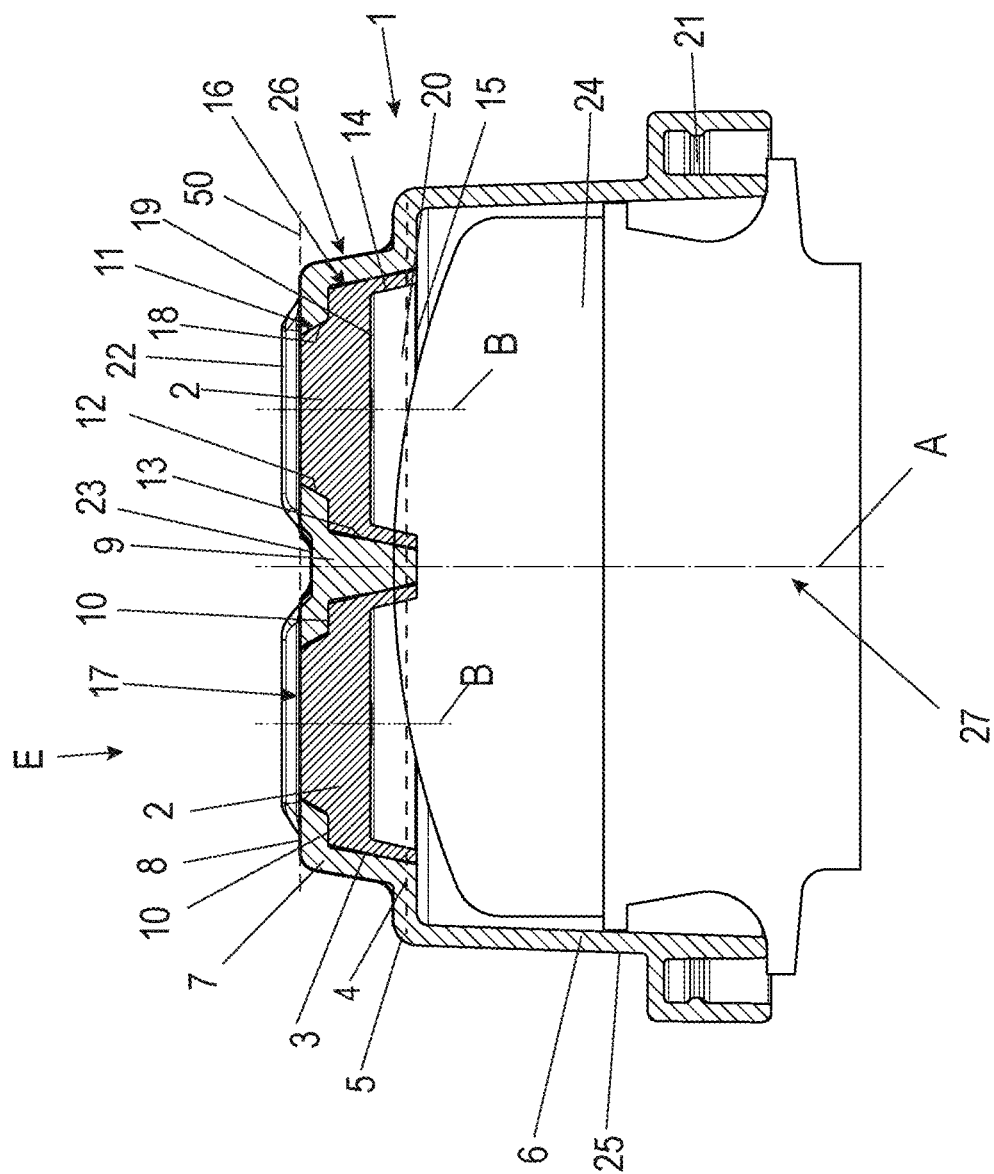

(51) Int. Cl.
*B29C 65/16* (2006.01)
*B29L 31/56* (2006.01)

(58) Field of Classification Search
USPC .................................. 215/249, 247; 604/415
See application file for complete search history.

(56) References Cited

U.S. PATENT DOCUMENTS

| | | | | |
|---|---|---|---|---|
| 2,734,649 | A * | 2/1956 | Callahan et al. | B65D 55/0845 215/233 |
| 3,017,050 | A * | 1/1962 | Barr, Sr. | B01L 3/50825 D24/224 |
| 3,358,865 | A * | 12/1967 | Andersen | B65D 51/002 215/249 |
| 3,637,102 | A * | 1/1972 | Shaw | B65D 51/002 215/247 |
| 3,760,969 | A * | 9/1973 | Shimamoto | B29C 45/14 215/274 |
| 4,089,432 | A * | 5/1978 | Crankshaw | B65D 25/082 604/416 |
| 4,153,173 | A * | 5/1979 | Ward | A61J 1/1431 215/247 |
| 4,176,756 | A * | 12/1979 | Gellman | B65D 51/002 403/309 |
| RE31,082 | E * | 11/1982 | Winchell | B65D 1/0238 215/249 |
| 4,418,827 | A * | 12/1983 | Butterfield | B65D 51/002 215/247 |
| 4,501,372 | A * | 2/1985 | Hansen | B65D 51/002 215/253 |
| 4,934,545 | A * | 6/1990 | Pezzoli | A61J 1/1406 215/250 |
| 5,025,955 | A * | 6/1991 | Stenger | B67B 7/26 222/400.8 |
| 5,395,365 | A * | 3/1995 | Weiler | A61J 1/1406 206/505 |
| 5,527,580 | A * | 6/1996 | Ikeda | B01L 3/50825 604/230 |
| 5,632,396 | A * | 5/1997 | Burns | A61B 5/150732 220/254.1 |
| 5,678,713 | A * | 10/1997 | Derksen | A61J 1/1406 215/254 |
| 5,921,419 | A * | 7/1999 | Niedospial, Jr. | B65D 51/002 215/247 |
| 6,286,699 | B1 * | 9/2001 | Sudo | B65D 39/00 215/247 |
| 8,225,949 | B2 * | 7/2012 | Aneas | B65D 51/241 604/905 |
| 8,616,401 | B2 * | 12/2013 | Zolcher | B65D 51/002 220/378 |
| 8,720,715 | B2 | 5/2014 | Mader | |
| 9,095,500 | B2 * | 8/2015 | Brandenburger | A61J 1/1418 |
| 9,237,985 | B2 * | 1/2016 | Eckhoff | A61J 1/1406 |
| 9,731,872 | B2 * | 8/2017 | Beine | A61J 1/1487 |
| 11,034,491 | B2 * | 6/2021 | Brandenburger | A61J 1/1406 |
| D926,032 | S * | 7/2021 | Braun | D9/435 |
| 11,059,638 | B2 * | 7/2021 | Spallek | A61J 1/1431 |
| 11,351,090 | B2 * | 6/2022 | Brandenburger | A61J 1/1406 |
| 11,369,708 | B2 * | 6/2022 | Spallek | A61L 2/186 |
| 2002/0113033 | A1 * | 8/2002 | Claessens | B29C 45/16 215/355 |
| 2004/0112855 | A1 * | 6/2004 | Becker | B65D 51/002 215/247 |
| 2004/0141886 | A1 * | 7/2004 | Py | B65B 3/003 141/329 |
| 2006/0231519 | A1 * | 10/2006 | Py | B65D 51/18 220/259.3 |
| 2008/0011707 | A1 * | 1/2008 | Suzuki | B65D 51/002 215/296 |
| 2009/0054865 | A1 * | 2/2009 | Brandenburger | B65D 51/002 215/247 |
| 2010/0059474 | A1 * | 3/2010 | Brandenburger | A61J 1/1418 215/316 |
| 2010/0326990 | A1 * | 12/2010 | Mader | A61J 1/1406 220/269 |
| 2011/0245796 | A1 * | 10/2011 | Brandenburger | A61J 1/18 604/414 |
| 2012/0160850 | A1 * | 6/2012 | Gelibert | B65D 55/063 220/315 |
| 2013/0037509 | A1 * | 2/2013 | Rahimy | A61J 1/1418 215/250 |
| 2013/0119011 | A1 * | 5/2013 | Kawachi | B29C 45/14811 215/355 |
| 2015/0352012 | A1 * | 12/2015 | Pittet | B65D 51/002 604/415 |
| 2016/0067142 | A1 * | 3/2016 | Becker | A61J 1/1412 |
| 2017/0326031 | A1 * | 11/2017 | Masuyama | B65D 39/0005 |
| 2018/0185840 | A1 * | 7/2018 | Blake | A61B 10/0045 |
| 2019/0000716 | A1 * | 1/2019 | Fiere | A61J 1/1418 |
| 2019/0021946 | A1 * | 1/2019 | Iibuchi | A61M 5/28 |
| 2019/0039035 | A1 * | 2/2019 | Kapre | A61J 1/2048 |
| 2019/0225390 | A1 * | 7/2019 | Spallek | A61J 1/1406 |
| 2019/0344939 | A1 * | 11/2019 | Brandenburger | A61J 1/1406 |
| 2020/0038288 | A1 * | 2/2020 | Consolaro | B65D 17/4012 |
| 2021/0162086 | A1 * | 6/2021 | Spallek | A61L 2/183 |
| 2022/0250803 | A1 * | 8/2022 | Koutal | B65D 41/28 |
| 2023/0008204 | A1 * | 1/2023 | Farren | A61J 1/065 |
| 2023/0248957 | A1 * | 8/2023 | Fuchs | A61J 1/1412 604/403 |
| 2024/0124201 | A1 * | 4/2024 | Braun | B29C 65/16 |
| 2024/0375831 | A1 * | 11/2024 | Vallotton | A61M 39/20 |

FOREIGN PATENT DOCUMENTS

| | | | |
|---|---|---|---|
| DE | 102008060457 A1 | 6/2010 | |
| DE | 102016003253 A1 | 9/2017 | |
| DE | 102017000048 A1 | 7/2018 | |
| EP | 2376341 B1 | 7/2013 | |
| JP | 2007014513 A | 1/2007 | |
| JP | 2007313297 A | 12/2007 | |
| JP | 2020504057 A | 2/2020 | |
| WO | WO-2014114685 A1 * | 7/2014 | ............... A61J 1/14 |
| WO | 2019129524 A2 | 7/2019 | |

OTHER PUBLICATIONS

International Search Report and Written Opinion mailed Nov. 18, 2021 in related/corresponding International Application No. PCT/EP2021/063705.

Search Report created Jul. 16, 2021 in related/corresponding DE Application No. 10 2021 104 026.4.

Office Action dated Oct. 29, 2024 in related/corresponding JP Application No. 2023-550160.

* cited by examiner

CAP FOR CLOSING A CONTAINER FOR ADMINISTERING A MEDICATION, AND METHOD FOR PRODUCING SAME

BACKGROUND AND SUMMARY OF THE INVENTION

Exemplary embodiments of the present application relate to a cap for closing a container for administering a medication and a method for producing the same.

Caps for closing drug containers, such as infusion bottles or infusion bags, are subject to a large number of safety aspects, both in terms of tightness to the escape of drugs and to the entry of media from the outside. Therefore, in the context of further developments, considerations often have to be made with regard to various design aspects.

A closure for a medication container is known from EP 2 376 341 A1, which for mechanical decoupling of deformation forces on the outer wall has a receptacle spaced from a cap wall and directed inwards from the base region of the cap. In this case, the outer wall of the cap protects the receptacle and its enclosure from mechanical action from the outside. At the same time, a septum is held under pretension inside the cap.

The disadvantage of internal undercuts, annular gaps, and the like in the product-contacting area of closure systems is that the product is not retained here, which, provided the cap is positioned with the septa downwards, is not delivered to the patient.

In other prior art variants, a dead volume is built up by the septa shape. Depending on how the septa are inserted and fixed in the body of the cap, the septa shapes can differ greatly from one another. In DE 10 2017 000 048 A1, FIGS. 7 and 8 show a generic variant of a cap with septa having a circumferential annular groove 39 opposite the puncture site. This annular groove represents a dead volume in which fluid can collect that is not delivered to the patient. In a further variant of FIGS. 9a and 9b, the septum is of thick and protruding design. Again, there is a dead volume in the bottom area between the puncture site and the edge of the cap due to the design. However, the septa shapes of this document are intended to ensure the tightness of the cap and to reduce the dead volume to a minimum.

DE 10 2008 060 457 A1 discloses a variant of a cap in which a septum is welded to a body of a cap without pretension. However, due to the pretension-free mounting of the septum, lower holding and sealing forces are exerted on liquid transfer devices such as piercing parts. The piercing parts are preferably pin-like or spike-like. The sealing and holding forces are to be increased.

The increase in sealing forces with an increase in radial pretensioning, as known from DE 10 2017 000 048 A1, also disadvantageously leads to an increase in the puncture forces of the piercing parts. The radial pretensioning of the septa during assembly in the cap must be such that the piercing length and thus the piercing resistance is selected in such a way that, on the one hand, the sealing and holding function is improved and, on the other hand, the piercing forces can be reduced. The features mentioned in the main claim also enable material and cost savings to be achieved in the manufacture of the septa.

Tightness between the cap and the septum can be achieved in different ways with a septum. In DE 198 18 314 A1, the tightness of the septum to the cap is mainly achieved by clamping the septum in the cap via a clip part 26.

Figure 2:
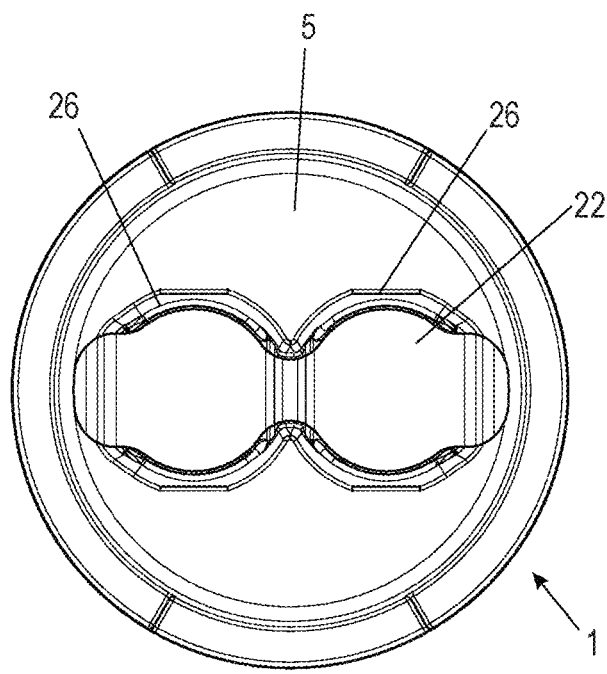

DE 10 2016 003 253 A1 of the same genus shows a variant of a septum with a sealing lip 16 running around the edge, which merges centrally into a sealing surface. In the variant shown in FIG. 3b, this sealing surface can have a flat profile. However, to ensure sufficient pretension for adequate sealing, the sealing lips 16 are solid and protrude visibly from the receiving space. Thus, a dead volume is formed in the intermediate space or dead space between the septa and also between each septum and the cap wall, as can be seen in FIG. 2. The formation of a dead volume or dead space is reduced compared to other septa in DE 10 2016 003 253 A1, but not completely prevented. This is required because the septum is held in the cap in a friction-locked manner without additional material closure such as bonding or welding.

Based on this prior art, exemplary embodiments of the present invention are directed to keeping a septum under pretension, but avoiding product-retaining undercuts and annular gaps in the body of the cap as far as possible.

A cap according to the invention for closing a container for administering a medication comprises a pot-shaped body having a cavity with at least one or more openings and a base plane for delimiting the cavity at least in some regions. The cavity can have openings, in particular on opposite sides of a lateral surface, e.g., a conical lateral surface, in order to allow access of medications into the cavity on the one hand and to allow access of a needle into the cavity after piercing the septum on the other hand. An opening can be provided in the bottom region of the cap.

The body also has a dome with an end-face opening that is closed by the septum, wherein the dome protrudes from the base plane on a base plane side opposite to the cavity. The opening in the bottom region of the cap may merge into another cavity within the dome. This cavity is closed to the outside by the septum. In the present invention, no protection against deformation forces acting from the outside has been provided, but the dome is exposed to these deformation forces. However, the area of application of the dome is so small that the probability of deformation in this region is comparatively low. At the same time, however, the dosage of an infusion bag is more accurate, particularly in the case of an overhead infusion with the infusion bag suspended, since no undercuts are provided in the cap in which drug remains. In addition, the cap can optionally also be used for multiple applications.

The septum is inserted under pretension into a receiving space of the dome. This supports a tight closure of the septum after the single and especially also multiple perforation by a needle, cannula, or other elements.

This pretension can be additionally increased by several design variants so that the pretension is so great that the tightness of the septum is not affected even by deformation of the outer wall of the dome.

It is advantageous if the septum has an oversize of at least 2.5%, preferably 3-10%, with respect to a first radially circumferential inner surface of the receiving space. Septa with a high material thickness usually cannot accommodate an interference fit to this extent. It is therefore advantageous if the axial extension of the area in which the septum has a closed surface across the width of the dome extends over less than 70% of the dome height.

It is further advantageous for the force buildup of a pretension if the first inner surface has a conical course, and preferably a course with a deviation of 3-10° compared to a parallel course of the inner surface with respect to a dome center axis B. This allows an additional holding effect of the septum and enables a higher sealing force over the height of the septum compared to a septum with a cylindrical basic shape. The septum under pretension allows the buildup of an approximately equal sealing force and an equal tension level over the height of the receptacle.

In addition, the thickness of the septum can be reduced or the puncture length into the septum can be reduced. This means that lower insertion forces are required and the material tear-off during insertion is reduced.

It is particularly preferred for tightness if a materially bonded connection, e.g., as a welded connection or adhesive connection, is arranged between the septum and the body. This materially bonded connection can be designed particularly preferably as a welded connection A welded connection extending radially around the dome center axis B is particularly preferred. In addition to the positive and non-positive connection of the septum and the dome by means of the pretension, this welded connection then forms a second safety measure, i.e., a so-called "second line of defense" against the escape of drug or the entry of medium.

Particularly preferably, the welded connection is positioned in such a way that radial tensile forces act on the septum if a puncture is made. This is advantageous because material displacement, which occurs with thick septa, is compensated by the tensile movement. Such radial tensile forces occur, in particular, when the septum is welded to the body in the axial direction, relative to its own septum center axis or septum longitudinal axis.

The septum can be made of a thermoplastic elastomer, especially as this can be welded and is particularly suitable for building up a pretension due to its elastic properties. Individual sections, e.g., individual layers, of the septum can also be made of another material, but at least the contact surface on the dome on which the welding takes place should preferably be made of the TPE material. Particularly preferably, however, the entire septum can also be made of TPE.

The cap may have a second radially circumferential inner surface for defining the receiving space with a smaller average diameter than the first radially circumferential inner surface. Again, there may be a pretension between the body and the septum. It is advantageous if the septum has a smaller oversize relative to the second radially circumferential inner surface than relative to the first radially circumferential sealing surface.

Alternatively, or additionally, the second radially circumferential inner surface may deviate from the parallel course relative to the dome center axis by a larger angle than the first radially circumferential inner surface.

In particular, the septum can have a pretension gradient along the dome center axis, which can preferably increase in the direction of insertion. This means that no opening crater remains in the septum after removal of a needle.

Preferably, the materially bonded connection can be arranged between the first and second radially circumferential inner surfaces. As a result, the anchor point of the septum of the cap is located between two substantially equivalent working pretension areas.

A cylindrical contour of the seating of the septum or of the area in which the septum rests against the cap with oversize, as known from the prior art, exhibits a decrease in pretension along the course of the wall due to a lever length, which is why very thick septa must be used. This is particularly disadvantageous due to the material consumption and the increased force required to apply a puncture.

Due to the conical contour and/or the optimum positioning of the anchor point in the form of a welding or bonding point between two comparably short lever arms, a better force distribution of the pretension in the sealing area can be achieved and thus a better sealing effect. Thus, in turn, the thickness of the septum can be minimized at the same time.

Particularly preferably, the cap has two domes with identical contours. This leads to considerable material savings, especially in conjunction with the reduced septum thickness and improved sealing effect at the same time.

Advantageously, the septum can have a closed sealing surface extending across the width of the septum, with a radially circumferential web projecting from this sealing surface which, unlike in EP2 376 341 A1, is not mechanically decoupled from the outer wall of the cap but forms part of a radially circumferential outer surface of the septum that is in contact with the inner surface of the dome. The web thus rests against the side wall of the dome and serves as a spring arm to build up axial restoring forces in the event of axial deformation of the septum. However, deformation of the wall of the dome also leads directly to deformation of the web.

The body can be made of a thermoplastic material, preferably PP or PE, especially HDPE.

Further according to the invention is a method for producing the cap according to the invention, comprising the following steps:

A Providing a body, in particular a body as described above;
B Inserting the septum into the body, in particular by applying contact pressure;
C Forming a materially bonded connection between the septum and the body, in particular while at least partially maintaining the contact pressure.

This achieves a cap with a seal by means of pretensioning and by means of a materially bonded connection. The materially bonded connection reliably seals against lateral discharge of the drug, while the pretensioning, in addition to the seal at the edge, also contributes to the resealing of the septum after its perforation.

BRIEF DESCRIPTION OF THE DRAWING FIGURES

In the following, an embodiment variant of a cap according to the invention is explained in detail, wherein:

FIG. 1 shows a sectional view of an embodiment variant of a cap according to the invention;
FIG. 2 shows a top view of the cap according to the invention.

DETAILED DESCRIPTION

FIG. 1 and FIG. 2 show a cap 1 for closing a container (not shown in closer detail), for example an infusion bottle or an infusion bag.

The cap 1 has a body 25, preferably made of a first thermoplastic material, in particular of polypropylene—PP and/or of polyethylene—PE, in particular HDPE.

The body 25 has a substantially dimensionally stable design. The body 25 has a pot-shaped basic form with an open cavity 24 typical of this form. An opening 27 is provided for inserting or fitting the cap into a corresponding container, for example a bottle or a bag. This cavity 24 is bounded by a cone-shaped first wall segment 6, which defines a cap center axis A. The deviation of the cone shape of the wall segment from a cylindrical shape is less than 5°, preferably between 1-3°. This allows a contact pressure against the container.

The cone-shaped first wall segment 6 ends at a base plane 4, with a base plate 5. Depending on the shape of the counterpart corresponding to the cap 1 on the container, the base plane 4 can be defined by the base plate 5 and form a closure plane with respect to the container. However, the base plate 5 need not necessarily be arranged perpendicularly with respect to the wall segment 6, but the wall segment 6 merges with the base plate 5 through a circumferential edge, bend or rounding such that at least this circumferential edge, bend or rounding is located on the base plane 4, thereby defining the location of the base plane 4. In other words, the circumferential, preferably circular-circumferential, line formed by the vertices of the edge, bend or rounding may lie on the base plane 4 at half the wall thickness of the edge.

Starting from the base plane 4, the cavity 24 of the cap has no protrusions or undercuts in the direction of the interior of the cap, so that no incrustations, e.g., when ingredients of the drug, which may typically be present as a solution, crystallize out, are formed.

Starting from the base level 4, the body 25 has a receiving geometry for two septa 2 above the cavity 24 bounded by the first wall segment 6. The transition from the base plate 5 to the receiving geometry is step-shaped. The septa are made of a second material, with a lower hardness than the body 2, so that this can be pierced by conventional means of medical technology. Particularly preferably, the material is a TPE, i.e., a thermoplastic elastomer.

In FIG. 1, the receiving geometry of the body 25 comprises two domes 26 connected to each other by a web 9, which protrudes from the base plane 5 or the side of the base plate 5 facing away from the cavity 24. The web 9 has a recess in the form of a channel 23. It is understood that, in a variation of the present invention, only one dome may be formed.

Each dome 26 defines a respective dome center axis B and limits a receiving space 20 for a respective septum 2, wherein the receiving space is open on both sides axially with respect to the dome center axis B.

While the first opening 15 of the receiving space 20 represents a transition into the cavity 24, the second opening 17 is closed by the septum 2. As can be seen in FIG. 1, the sum of the mean diameters of both receiving spaces of the domes 26 is smaller than the mean diameter of the cavity 24.

Each dome 26 also has a first radially circumferential conical inner surface 16 that defines the receiving space for receiving the septum 2. The conical circumferential inner surface 16 defines an average diameter as the average of all diameters over the contact area of the inner surface with the septum.

In contrast, the respective septum 2 has an oversize of at least 2.5%, preferably 3-10%, in the contact area with this first inner surface 16. The oversize is shown in FIG. 1 with reference sign 3. In particular, the septum 2 has a first radially circumferential conical outer surface 13, which defines an average diameter. The difference between the diameters of the outer surface 13 of the septum 2, in the disassembled state, and the inner surface 16 of the dome 26 defines said oversize 3, so that the mean diameter of the outer surface 13 of the septum 2, in the disassembled state, is at least 2.5% larger than the diameter of the inner surface 16 of the dome 26.

In this case, the inner surface 16 comprises the largest contact area between the septum 2 and the dome 26. The second opening 17 defines a sealing plane 50. Along this sealing plane 50, leakage of medication is to be prevented.

The dome 26 comprises a step-shaped transition 7 with a second conical radially circumferential inner surface 11 of the dome, which ends in the opening 17. In contrast, the outer surface 12 of the respective septum 2 in the area of contact with this second inner surface 11 has an oversize 18 of at least 2.5%, preferably 3-10%, with the oversize 18 referring to the disassembled state of the septum 2.

The second conical radially circumferential inner surface 11 has a greater conicity, i.e., a greater deviation from the course of a parallel cylindrical shape, than the first conical radially circumferential inner surface 16. The oversize can preferably be smaller than the oversize in the area of the first inner surface 16, so that a gradual pretension is built up over the course of the dome center axis. This allows an initial displacement of material of the septum 2 in the puncture area to the outside, but at the same time a sealing effect can also be achieved in this area.

The step-shaped transition 7 of the dome 26 comprises a surface segment 10 extending essentially parallel to the sealing plane 50. The surface segment 10 can also have an oblique, in particular conical, course. This surface segment 10 has a materially bonded connection between the dome 26 and the septum 2.

The materially bonded connection in the surface segment 10 is preferably a welded connection. The welded connection can be produced by laser welding, wherein the laser beam can be directed onto an outer surface of the cap 1 forming the sealing plane 50, in particular an end face 8 of the cap 1, which has manufacturing advantages and advantages for the sealing effect.

In the area of the surface segment 10, the septum rests against the inner surface of the dome 26 in a substantially stress-free manner. This reduces material stresses during welding so that a sealing effect is enhanced and material separation is prevented.

The septum 2 has a closed sealing surface 19 directed toward the cavity 24 and extending across the width of the septum. A radially circumferential web 14 protrudes from this sealing surface, forming part of the radially circumferential outer surface of the septum 2 in contact with the inner surface 16 of the dome.

As can be seen directly from FIG. 1, the sealing surface 19 in the area between the radially circumferential web 15 has a flat course, in particular an exclusively flat course.

FIG. 1 also shows that the width of this flat course of the sealing surface 19 occupies substantially more than 50% of the total width of the septum 2.

As can further be seen from FIG. 1, the web 14 rests against the inner surface 16 of the dome 26 and is flush with the receiving space 20 of the dome 26.

The dome 26 protrudes from the base plate 5, with the receiving space 20 of the dome 26 extending up to an inner surface of the base plate 5 facing the cavity 24, as shown in FIG. 1.

This web 14 increases the sealing effect of the septum 2 in the edge area and enables a high pretension to be built up, wherein the free space between the opposing segments of the web 14 can also be used for material displacement, e.g., when a needle is inserted into the septum. At the same time, the segments of the web 14 serve as spring arms when the septum is deformed in the axial direction, e.g., when larger needles are inserted into the septum. As a result, a restoring force is formed in the axial direction, so that when the cannula is removed, in addition to the radial pretension, an axial component acts to close the puncture site.

The web may preferably have a radial mean width of less than 50%, preferably less than 35% axial height of the outer surface of the septum 2 in contact with the inner surface 16 of the dome 26.

The conicity of the second inner surface 16 of the dome 26 is also less than that of the first inner surface 11, so that also as a result a different, in particular lower, pretension is built up in the septum 2 in the upper region of the septum 2 during piercing than in the lower region, wherein "upper" and "lower" refer here to the direction of piercing E and the position of the sealing plane 50 from which the piercing is made.

Not shown in FIG. 1 is that the web 9 between both septa 2 is connected to the base plate 5 in the plane of representation. Overall, the top view of the cap in the piercing direction results in an oval basic shape for the entire receptacle geometry, including the domes 26.

The cap 1 shown in FIG. 1 is idealized. Here, the sealing plane 50 is defined by the opening edges of the openings 17. In reality, the septa end face, which is essentially perpendicular to the direction of penetration, may be slightly curved relative to the sealing plane due to the pretension.

Further part of the invention is a method for producing the aforementioned cap 1. The method comprises a first step in which a body 25 is provided. This body 25 can be produced, for example, by an injection molding process or by another suitable plastic processing method.

In a second step of the method, the septa 2 can be inserted into the receiving space 20 of the domes 26 of the body 25. The septa can be inserted by applying contact pressure to the septa.

This contact pressure can be at least partially maintained in the subsequent step, in which a materially bonded connection is created between the respective septum 2 and the body 25. The materially bonded connection is made at the surface segment 10, preferably by a welded connection. This can be achieved by laser welding.

The septum, or the sealing plane, can then be covered by a covering element 22, for example a plastic or aluminum foil or a molded plastic body, which can be part of the cap. This can be seen, for example, in the top view of FIG. 2.

The cap can then be packaged under aseptic conditions.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

1 Cap
2 Septum
3 Oversize
4 Base plane
5 Base plate
6 Wall segment
7 Step-shaped transition
8 End face of the cap
9 Web
10 Surface segment
11 Second conical inner surface
12 Second conical outer surface of the septum
13 First conical outer surface of the septum
14 Circumferential web
15 First opening
16 First conical inner surface
17 Second opening
18 Oversize
19 Sealing surface
20 Receiving space
21 Annular web
22 Cover element
23 Channel
24 Cavity
25 Body
26 Dome
27 Opening
50 Sealing plane
A Longitudinal axis of the cap
B Dome center axis
E Direction of piercing

The invention claimed is:

1. A cap for closing a container for administering a medication, the cap comprising:
  a pot-shaped body having a cavity with at least one or more openings and a base plane delimiting the cavity at least in some regions; and
  at least one septum, wherein the pot-shaped body has a dome with an end-face opening closed by the septum,
  wherein the dome protrudes from the base plane on a side of the base plane opposite to the cavity,
  wherein the septum is inserted into a receiving space of the dome under pretension,
  wherein a materially bonded connection is arranged between the septum and the pot-shaped body, wherein the materially bonded connection is arranged between a first and a second radially circumferential inner surface of the dome,
  wherein the septum has a closed sealing surface extending over a width of the septum,
  wherein a radially circumferential web protrudes from the closed sealing surface, wherein the radially circumferential web forms a part of a radially circumferential outer surface of the septum in contact with the first radially circumferential inner surface of the dome,
  wherein the closed sealing surface has a flat profile in a region between the radially circumferential web, and
  wherein the first radially circumferential inner surface of the dome has a conical course with a deviation of 3-10° with respect to a parallel course of the first radially circumferential inner surface with respect to a center axis of the dome.

2. The cap of claim 1, wherein the radially circumferential web has a radial mean width of less than 35% axial height of the radially circumferential outer surface of the septum in contact with the first radially circumferential inner surface of the dome.

3. The cap of claim 1, wherein the dome protrudes with respect to a base plate, wherein the receiving space of the dome extends up to an inner surface of the base plate facing the cavity.

4. The cap of claim 1, wherein the radially circumferential web rests against the first radially circumferential inner surface of the dome and is flush with the receiving space.

5. The cap of claim 1, wherein the materially bonded connection is a welded connection extending radially around a center axis of the dome.

6. The cap of claim 5, wherein the welded connection is positioned in such a way that radial tensile forces act on the septum when punctured.

7. The cap of claim 1, wherein the materially bonded connection is arranged in a step-shaped transition of the dome, between the first and the second radially circumferential inner surfaces of the dome.

8. The cap of claim 7, wherein the end-face opening defines a sealing plane, wherein the step-shaped transition of the dome comprises a surface segment extending substantially parallel to a sealing plane of the septum, and wherein the surface segment comprises the materially bonded connection between the dome and the septum.

9. The cap of claim 8, wherein the materially bonded connection is a laser welded connection, which is producible by directing a laser beam onto the sealing plane forming the cap of the cap.

10. The cap of claim 8, wherein the septum rests, without pretension, against an inner surface of the dome in a region of the surface segment.

11. The cap of claim 1, wherein the septum has an oversize of at least 2.5% with respect to the first radially circumferential inner surface of the receiving space.

12. The cap of claim 1, wherein the septum is comprised of a thermoplastic elastomer.

13. The cap of claim 1, wherein the second radially circumferential inner surface delimits the receiving space with a smaller average diameter than the first radially circumferential inner surface.

14. The cap of claim 1, wherein the septum has a smaller oversize relative to the second radially circumferential inner surface than relative to the first radially circumferential inner surface.

15. The cap of claim 1, wherein the dome comprises two domes with identical contours.

16. The cap of claim 15, wherein the septum comprises two septa with identical contours.

17. The cap of claim 1, wherein the second radially circumferential inner surface deviates from a parallel course relative to the center axis of the dome by a greater angle than the first radially circumferential inner surface.

18. The cap of claim 1, wherein the septum has a pretension gradient along the center axis of the dome.

19. The cap of claim 1, wherein the pot-shaped body is comprised of an HDPE thermoplastic material.

20. The cap of claim 1, wherein the dome occupies a height of less than 30% of a total height of the cap.

21. The cap of claim 3, wherein a plane defined by the base plate of the cavity of the cap has no protrusions or undercuts, to prevent incrustations when ingredients of the medication crystallize out.

22. A method for producing a cap for closing a container for administering a medication, the method comprising:
    providing a pot-shaped body having a cavity with at least one or more openings and a base plane delimiting the cavity at least in some regions;
    inserting a septum into the pot-shaped body by applying contact pressure, wherein the pot-shaped body has a dome with an end-face opening, wherein the septum is inserted into a receiving space of the dome under pretension, wherein the end-face opening of the dome is closed by the septum, and wherein the dome protrudes from the base plane on a side of the base plane opposite to the cavity; and
    forming a materially bonded connection between the septum and the pot-shaped body while at least partially maintaining the contact pressure, wherein the materially bonded connection is produced as a welded connection by laser welding, wherein a laser beam is directed onto an outer surface of the cap forming a sealing plane, and wherein the materially bonded connection is arranged between a first and a second radially circumferential inner surface of the dome,
    wherein the septum has a closed sealing surface extending over a width of the septum,
    wherein a radially circumferential web protrudes from the closed sealing surface, wherein the radially circumferential web forms a part of a radially circumferential outer surface of the septum in contact with the first radially circumferential inner surface of the dome,
    wherein the closed sealing surface has a flat profile in a region between the radially circumferential web, and
    wherein the first radially circumferential inner surface of the dome has a conical course with a deviation of 3-10° with respect to a parallel course of the first radially circumferential inner surface with respect to a center axis of the dome.

* * * * *